United States Patent
Schladenhauffen et al.

(10) Patent No.: US 6,937,812 B2
(45) Date of Patent: Aug. 30, 2005

(54) MULTIPLE VIEWING ANGLE COVER HAVING INTEGRAL LIGHT PIPE

(75) Inventors: Mark S. Schladenhauffen, Westford, MA (US); Hassan R. Manjunath, Nashua, NH (US); Patrick J. Delaney, III, Sudbury, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 564 days.

(21) Appl. No.: 09/881,621

(22) Filed: Jun. 14, 2001

(65) Prior Publication Data

US 2002/0191920 A1 Dec. 19, 2002

(51) Int. Cl.[7] .............................................. G02B 6/42
(52) U.S. Cl. ........................ 385/146; 385/92; 385/134
(58) Field of Search ............................ 385/146, 92–94, 385/134, 138; 362/31

(56) References Cited

U.S. PATENT DOCUMENTS

| | | | | |
|---|---|---|---|---|
| 3,576,563 A | * | 4/1971 | Scott et al. | 385/115 |
| 5,806,955 A | * | 9/1998 | Parkyn et al. | 362/31 |
| 6,204,501 B1 | * | 3/2001 | Cutler | 250/352 |

* cited by examiner

Primary Examiner—Frank G. Font
Assistant Examiner—Michael P. Mooney
(74) Attorney, Agent, or Firm—Patrick S. Yoder; William B. Walbrun

(57) ABSTRACT

An electronic device using total internal reflection to guide light from a light source housed within the electronic device to the surface of the device. The electronic device has a cover secured to a protective housing to form a protective enclosure for the electronic device. The cover is adapted to use total internal reflection to guide light through the cover to a plurality of surface portion of the cover. A second surface portion of the cover is adapted to totally internally reflect a first portion of the light to the first surface portion.

39 Claims, 4 Drawing Sheets

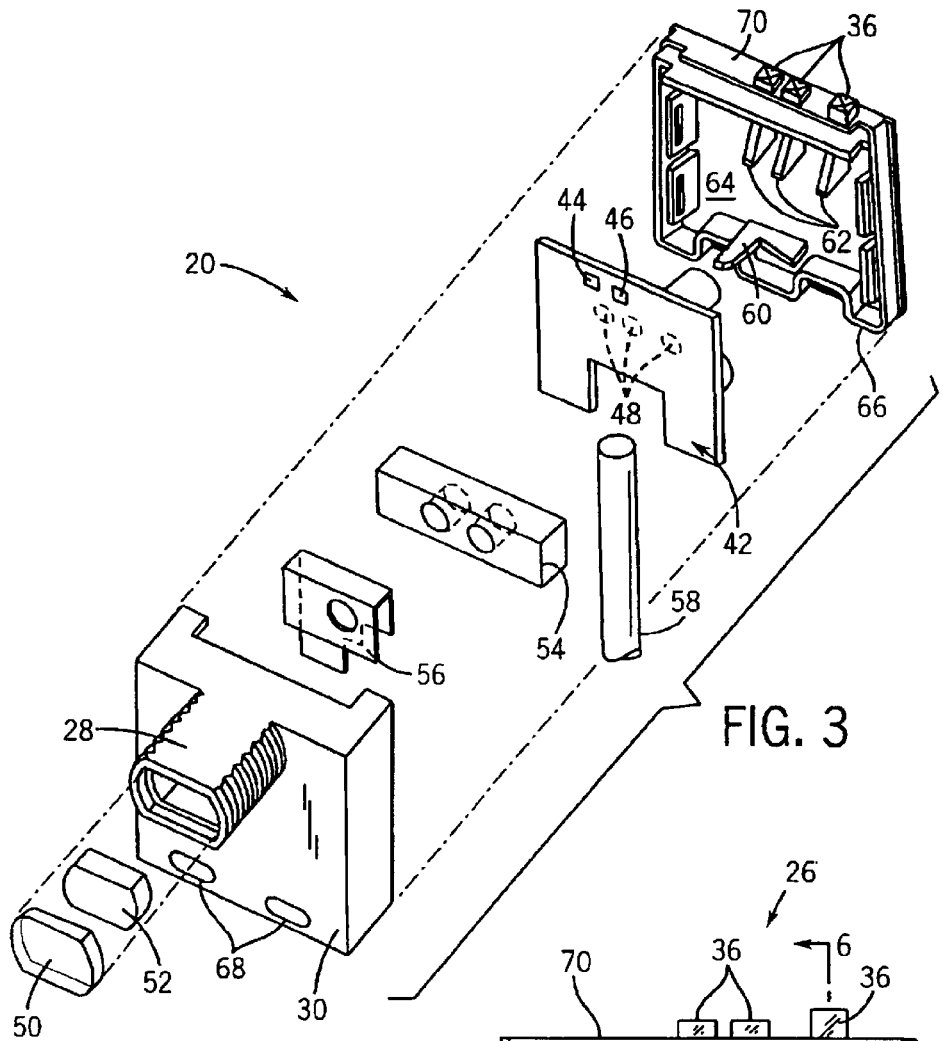
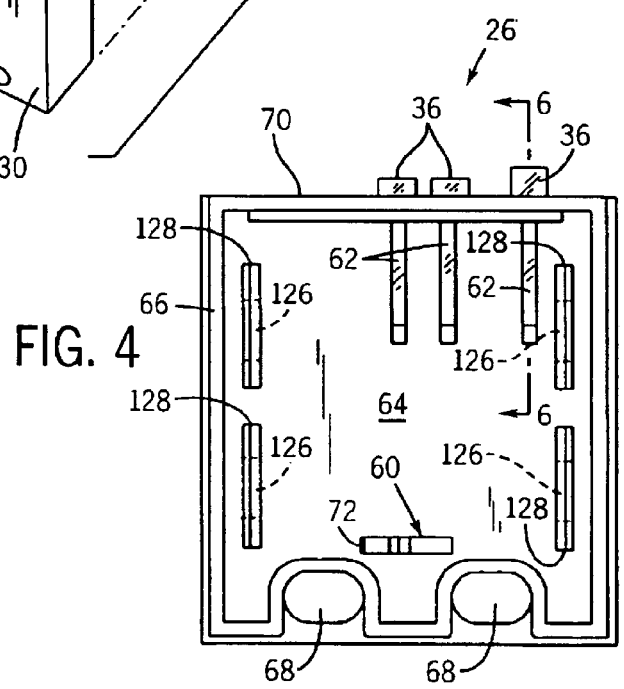

US 6,937,812 B2

MULTIPLE VIEWING ANGLE COVER HAVING INTEGRAL LIGHT PIPE

BACKGROUND OF THE INVENTION

1. Field of the Invention

The present invention relates generally to the field of enclosures for electronic devices. More particularly, the invention relates to a technique for optically coupling the light produced by a light emitting source housed within an enclosure to the exterior of the enclosure via a light pipe integrated into a cover of the enclosure, the cover enabling a viewer to view the light from multiple viewing angles around the enclosure.

2. Description of the Related Art

Many electronic devices are designed to produce a visual output. The visual output may provide a myriad of information in a myriad of ways. For example, a device may provide text and images on a computer monitor. Alternatively, a device's visual output may be a light to indicate that the device is operating.

The type of visual output used may be dictated by a number of factors, such as the information to be conveyed and the operating environment of the device. For example, a production line may utilize one or more electronic sensors to provide an operator with information regarding the status of production. An electronic sensor may be placed anywhere along the production line. The electronic sensor may be located at floor level, below floor level, or above floor level, depending on the orientation of the production line. Typically, the visual output of a sensor is visible from only one location from the workfloor.

Many electronic devices utilize a light emitting diode (LED) to convey information. In some instances, an LED may be mounted on an exterior surface of an electronic device. However, the LED is more susceptible to damage when mounted on the exterior of an electronic device. Additionally, electrical wiring typically must be routed to the LED to enable it to operate. In some instances, an LED, or LED's, may act as nuisance sources of electro-optical/electro-magnetic noise. LED's also have been mounted on circuit boards housed within a protective enclosure. The light from an LED may be coupled through a window to the outside. Alternatively, a light guide, such as a fiber optic cable, may be used to direct light from the LED to the outside of the enclosure. The assembly of the device is complicated by the need to route the light guide from the LED to a cover of the enclosure. Additionally, in both of these configurations the viewing angle for viewing the light from the LED is limited. In the former, a viewer is only able to see the light from the LED when the viewer is positioned directly in the line of sight of the window and the LED. In the latter, the process of reflecting the light internally through the optical fiber results in the optical fiber effectively producing a unidirectional beam of light. As a result, a viewer located directly across from the fiber optic cable may be able to see the light from the LED but a viewer located on another side of the device may not. In a production environment, where an operator may be constantly changing positions, an electronic device having a visual output with a limited viewing angle may be problematic to production. For example, a production line may have a sensor to detect various operating conditions on the line. The sensor may utilize one or more LED's to indicate these operating conditions to an operator. If the operator cannot see the output of the LED's from the operator's location, either the information will be lost or the operator will have to move to a another location where the output of the LED can be seen.

There is a need, therefore, for an improved technique for optically coupling the light from an LED housed within an enclosure to a viewer located on the outside of the enclosure in a manner that will enable the light to be seen from multiple viewing angles around the electronic device.

SUMMARY OF THE INVENTION

The present invention provides a technique for providing visual information from an electronic device designed to respond to these needs. According to one aspect of the technique, an electronic device housing a light source is featured. The electronic device has a protective enclosure formed from a protective housing and a cover secured to the protective housing. The cover forms a light guide for guiding a first portion of light from the light source to a first surface portion of the cover. A second surface portion of the cover is adapted to totally internally reflect the first portion of the light to the first surface portion. The electronic device may receive power via a cable inserted into the protective housing. The cover may have a guide portion adapted to guide the cable to a desired position within the housing and to secure the cable between the protective housing and the cover as the cover is secured to the protective housing.

According to another aspect of the present invention, a protective cover for an enclosure is featured. The protective cover has a first surface region and a second surface region. The first surface region is oriented on a first side of the enclosure and the second surface region is oriented on a second side of the enclosure. A first portion of the cover is adapted to receive light from a light source and to totally internally reflect the light to the first surface region and the second surface region. The cover may have a guide portion adapted to guide a power cable to a desired position within the housing and to secure the cable between the protective housing and the cover as the cover is secured to the protective housing.

According to another aspect of the present invention, a method of providing visual information from an electronic device is featured. The method produces light from a light source housed within a protective enclosure of the electronic device. The light from the light source provides data from the electronic device. The method also adapts the electronic device to guide the light from the light source to a plurality of surface portions of the enclosure. Total internal reflection is used to guide the light through a portion of the cover of the enclosure. The method also refracts the light at the plurality of surface portions so that the light is visible from a plurality of sides of the enclosure.

According to another aspect of the present invention, a method of manufacturing a cover for an electronic device is featured. The method identifies a moldable material's critical angle for total internal reflection of light from a light source. The light source is housed within the electronic device. The method also designs a shape for the cover that uses total internal reflection to direct light from the light source to a surface portion of the cover. The method also provides for molding the cover to the designed shape.

BRIEF DESCRIPTION OF THE DRAWINGS

The foregoing and other advantages of the invention will become apparent upon reading the following detailed description and upon reference to the drawings in which:

FIG. 3 is an exploded view of the components of the electronic sensor of FIG. 1;

FIG. 4 is a rear elevational view of a cover having integral light guides, according to an exemplary embodiment of the present invention;

DETAILED DESCRIPTION OF SPECIFIC EMBODIMENTS

Figure 1:
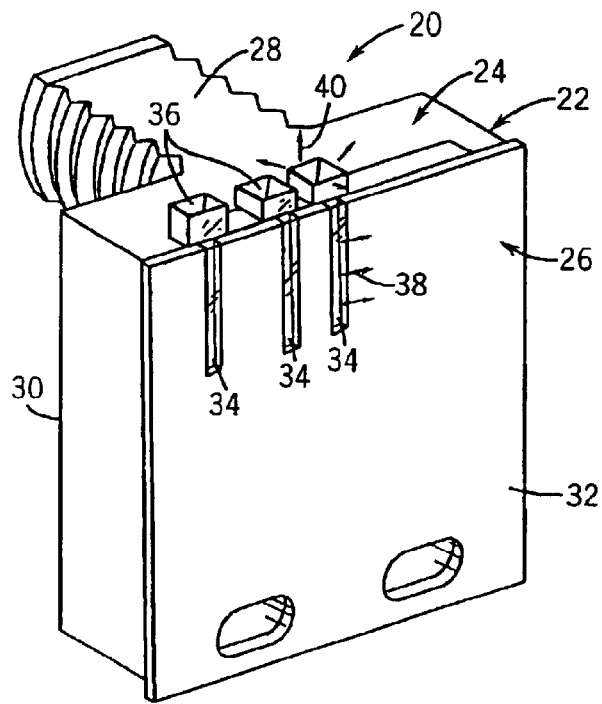
FIG. 1 is a first perspective view of an electronic sensor having an enclosure with a cover having integral light pipes to optically couple light from a plurality of LED's housed within the enclosure to a surface portion of the cover, according to an exemplary embodiment of the present invention.
Figure 2:
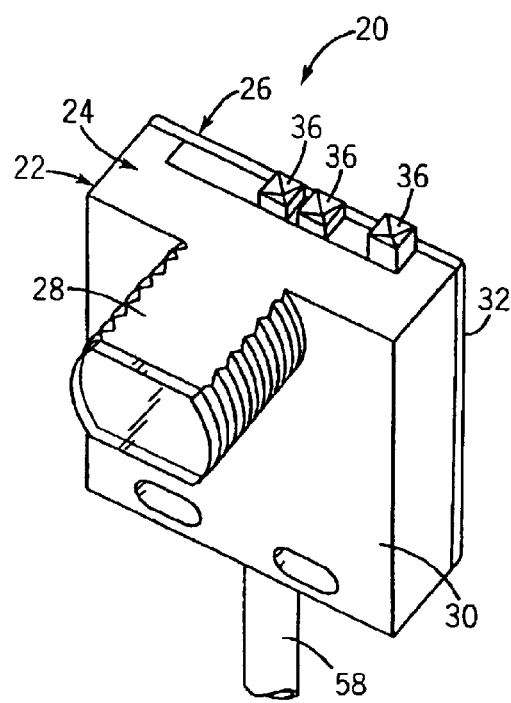
FIG. 2 is a second perspective view of the electronic sensor of FIG. 1.

Turning now to the drawings, and referring first to FIGS. 1 and 2, an electronic device, designated generally by the reference number 20, is illustrated. In the illustrated embodiment, the electronic device 20 is an optical sensor. However, the present invention is not limited to sensors. The electronic device has a protective enclosure 22 that utilizes a housing 24 and a cover 26 to house and protect components of the electronic device 20. In the illustrated embodiment, the cover 26 is securable to the housing 24. The protective enclosure 22 has a generally cubic shape. However, in this embodiment, the housing 24 is configured with a hollow extension 28 that extends outward from a flat surface 30 of the housing 24. In this embodiment, the hollow extension 28 enables an optical emitter and an optical receiver located within the housing 24 to have an unobstructed view of a target.

In the illustrated embodiment, a circuit board (not shown) having a plurality of light emitting diodes (LED's) (not shown) is housed within the housing 24 and cover 26. Alternatively, another device for emitting light may be used, such as a light bulb or semiconductor laser. Each LED may provide light of a single color or a plurality of colors. Furthermore, each of the plurality of LED's may provide one or more different colors of light. Additionally, the light from the LED's may be pulsed or continuous.

The cover 26 is adapted to form integral light guides for coupling the light from the LED's. The light guides use internal reflection to guide the light from the LED to the exterior of the enclosure 22. The cover 26 is configured with a generally flat portion 32 that extends generally over one side of the enclosure 22. In the illustrated embodiment, the cover 26 is comprised of a molded polymeric material, such as Trogamid®. Trogamid® is a transparent nylon material that has an average transmittance of 90% over the visible range of light, i.e., 350–680 nm. Generally, the surface of the cover 26 is formed with a relatively rough surface texture that makes the cover relatively opaque. However, in the illustrated embodiment, the cover 26 has a plurality of smooth strips 34 that are formed slightly recessed from the generally flat portion of the cover 26 during the molding process. The smooth strips 34 are made smooth by polishing the appropriate portion of the mold that forms the smooth strip. Each smooth strip 34 forms a portion of a light guide for an LED. The smooth surface of each smooth strip 34 enables light to be internally reflected at the surface of each smooth strip 34 in a precise manner. Additionally, the smooth surface of each strip 34 enables a portion of the light to be refracted through the surface without scattering. Thus, the smooth strips 34 in the illustrated embodiment serve two purposes: internally reflecting a portion of the light from an LED and refracting a portion of the light from the LED.

In the illustrated embodiment, the cover 26 also is configured with a plurality of inverted pyramid portions 36 that are located on a second side of the enclosure 22. In this embodiment, light from an LED is internally reflected through the cover 26 to an inverted pyramid portion 36. In the exemplary embodiment, the inverted pyramid portions 36 also are formed with a smooth surface during the molding process. The shape of an inverted pyramid portion 36 causes light that has been internally reflected through the cover to be refracted in many directions. This enables the light from an LED to be seen from multiple sides of the enclosure 22, such as the front, back, left and right. The inverted pyramid portions 36 may have different heights or may be otherwise be configured differently to assist in identification. For example, the far left pyramid 36 of FIG. 1 is taller than the other two pyramids 36. This enables a viewer to have an unobstructed view of light from the far left pyramid 36. Additionally, the portion 38 of the light that is coupled to the strips 34 is transmitted through the strips 34 and is visible from one or more sides of the enclosure. In fact, the cover 26 could be configured to transmit light in a myriad of configurations. For example, each LED could be coupled to a second inverted pyramid portion in addition to, or instead of, a smooth strip 34, or vice versa. In this configuration, an inverted pyramid portion 36 may be disposed on opposite sides of the enclosure 22. The cover 26 may be configured to transmit light from additional or different sides of the enclosure 22.

Referring generally to FIG. 3, the electronic device 20 is assembled from a plurality of components. A printed circuit (PC) board 42 is used to couple the various electronic components of the device 20. A transmitter 44 and a sensor 46 are located on one side of the PC board 42. Several LED's 48 are located on the other side of the PC board 42. A window 50 and a lens 52 are secured to the hollow extension 28 portion of the housing 24. The window 50 prevents contaminants from entering the interior of the enclosure 22 but is transparent to enable light to enter and exit the enclosure 22. The lens 52 focuses the light onto the optical sensors 46. An optical shield 54 is used to prevent the sensors 46 from being contaminated with light from sources other than light from the target area. In addition, the device 20 has an electronic shield 56 to prevent interference from outside sources of electrical noise. Power is supplied to the electronic components by a conductive cable 58. The conductive cable 58 is secured within the device 20 by a clasp 60. The clasp 60 secures the cable 58 between the cover 26 and the housing 24 when the cover 26 is secured to the housing 24. Also visible in this view are three generally triangular shaped portions 62 of the cover 26. Each triangular shaped portion 62 of the cover 26 is used to receive light from an LED 48 and internally reflect the light to the strip portions 34 and to the inverted pyramid portions 36.

Figure 5:
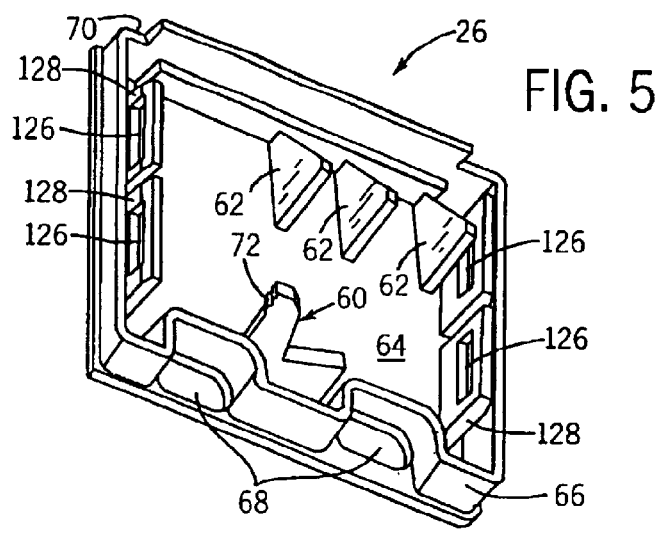
FIG. 5 is a rear perspective view of the cover of FIG. 4.

Referring generally to FIGS. 4 and 5, the cover 26 of the illustrated embodiment is adapted to use total internal reflection to couple light from three LED's 48. However, the cover 26 may be configured to couple light from a greater or lesser number of LED's. The LED's may be used to convey different pieces of information. For example, one of the LED's may indicate that the device has power. Another LED may provide an indication whenever the sensor detects a target object. Another LED may be used to indicate the sensitivity of the detector. Different colors may be used for each LED. In the illustrated embodiment, the cover 26 has three generally triangular shaped portions 62 extending from an interior surface 64 of the cover 26, one for each LED. However, additional triangular shaped portions 62 may be associated with each LED 48. For example, a second triangular shaped portion 62 may be used to couple light from an LED 48 to a second inverted pyramid portion 36.

The cover 26 has a lip 64 that extends from the interior surface 64 around the perimeter of the cover 26. The lip 64 is configured for engagement with a corresponding groove in the housing 24. In this embodiment, the cover 26 also has two openings 68 that align with two corresponding openings in the housing 24. Two securing members, such as threaded fasteners, are inserted through the openings 68 to secure the enclosure 22 to a surface. The cover 26 may have an adjustment hole to enable a screwdriver, or some other tool, to be inserted through the cover to adjust a potentiometer, or some other adjustable component, within the device 20. In the illustrated embodiment, the inverted pyramid portions 36 are located on a surface portion 70 of the cover 26. The surface portion 70 is disposed within a recess in the housing 24 when the cover 26 is secured to the housing 24.

Figure 6:
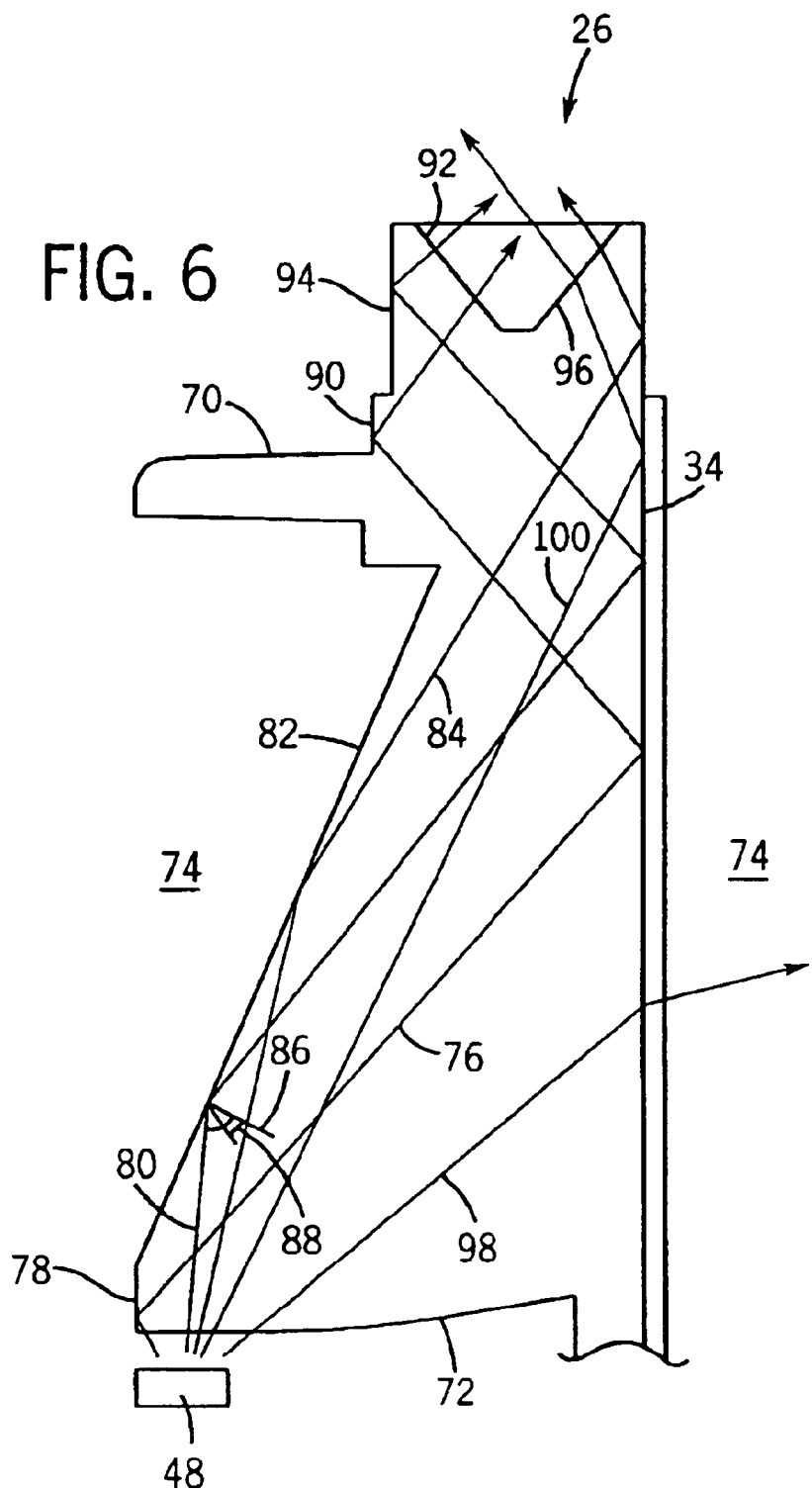
FIG. 6 is a cross-sectional view of the light guide portion of the cover, taken generally along line 6—6 of FIG. 4.

Referring generally to FIG. 6, generally, whenever a ray of light is incident on the boundary separating two different optical media, part of the ray is reflected back into the first media and the remainder is refracted as it enters the second media. Refraction is the bending of light as it passes through the boundary between two media. The directions taken by these rays can be described by two well-established laws of nature. The first law states that the angle at which the incident ray strikes the interface of two optical media, the angle of incidence, is exactly equal to the angle the reflected ray makes with the interface, the angle of reflection. The angles of incidence and reflection are commonly measured from a line perpendicular to the interface, known as the normal. Furthermore, the incident ray and the reflected ray lie in the same plane, the reflected ray lying on the opposite side of the normal from the incident ray. The second law states that the sine of the angle of incidence and the sine of the angle of refraction have a constant ratio for all angles of incidence. This constant ratio also is equal to the ratio of the indices of refraction of the two media. The index of refraction, or refractive index, of any optical medium is defined as the ratio between the speed of light in a vacuum and the speed of light in the medium. The refracted ray and the incident ray also lie in the same plane, the refracted ray lying on the opposite side of the normal from the incident ray. This relationship, known as Snell's law, can be written as follows:

$$n_1 \sin \theta_1 = n_2 \sin \theta_2$$

where: $n_1$ is the index of refraction of the first medium;
$\theta_1$ is the angle of incidence;
$n_2$ is the index of refraction of the second medium; and
$\theta_2$ is the angle of refraction.

However, there is an angle of incidence beyond which no light is refracted through the boundary between the two media. This is known as the critical angle, $\theta_C$. The critical angle is defined as the smallest angle of incidence, in the medium of greater index, for which light is totally reflected, i.e., no light is refracted through the boundary. The equation for finding the critical angle may be derived from Snell's law and can be written as follows:

$$\theta_C = \sin^{-1} (n_2/n_1)$$

where: $n_1$ is the index of refraction of the first medium;
$n_2$ is the index of refraction of the second medium; and
$\theta_C$ is the critical angle.

In the illustrated embodiment, divergent light rays from an LED 48 are incident on a first surface 72 of a triangular portion 62 of the cover 26. In the illustrated embodiment, the first surface 72 is adapted to collect light from the LED that might be reflected from a flat surface. In the illustrated embodiment, the cover 26 has several surfaces that are adapted to totally internally reflect light from each LED and direct the light to a strip portion 34 and an inverted pyramid portion 36. In this embodiment, the two media at each of the surfaces are air 74 and the material of the cover 26. The portions of the mold used to form the various surfaces are polished so that the surfaces of the cover 26 have a smooth polished texture. This prevents the light incident on the surfaces from being scattered. In the illustrated embodiment, a first ray 76 from the LED 48 is incident on a second surface 78 of the triangular portion 62 of the cover 26. A second ray 80 from the LED 48 is incident on a third surface 82 of the triangular portion 62 of the cover 26. A third ray 84 also is incident on the third surface 82. In the illustrated embodiment, the third surface 82 is angled approximately 25 degrees in relation to the flat portion 64 of the cover 26.

A line 86 represents the normal to each surface. The index of refraction of air 74 is, approximately, 1. In the illustrated embodiment, the index of refraction of the cover is approximately 1.566 at a wavelength of 589.3 mm. The critical angle, $\theta_c$, for a boundary between the air 74 and the cover 26 is approximately 39.7 degrees, as represented by angle 88. The first, second, and third rays are incident to the second and third surfaces, respectively, at angles greater than the critical angle. Consequently, the first, second, and third rays are totally internally reflected inside the cover 26 towards a fourth surface, the strip portion 34. The first, second, and third rays also are incident to the strip portion 34, at angles greater than the critical angle and are again totally internally reflected. The first ray 76 is incident to a fifth surface 90 and is again totally internally reflected. The first ray 76 is then incident to a first face 92 of the inverted pyramid portion 36. The first ray 76 is incident to the first face 92 at an angle less than the critical angle and is refracted through the first face 92. The second ray 80 is incident to a sixth surface 94 and, again, is totally internally reflected. The second ray 80 is then incident to the first face 92 of the inverted pyramid portion 36 at an angle less than the critical angle and is refracted through the first face 92. The third ray 84 is incident to a second face 96 of the inverted pyramid portion 36 at an angle less than the critical angle and is refracted through the second face 96. In the illustrated embodiment, the faces of the inverted pyramid are angled at an angle of approximately 45 degrees.

A fourth ray 98 and a fifth ray 100 from the LED 48 are incident on the strip portion 34 of the cover 26. The fourth ray 98 is incident to the strip portion 34 at an angle less than the critical angle and is refracted through the strip portion 34. Thus, a portion of the light from the LED 48 also is guided to and transmitted from the strip portion 34, as well as the inverted pyramid portion 36 of the cover 26. The fifth ray 100 is incident to the strip portion 34 at an angle greater than the critical angle and is totally internally reflected towards the second face 96 of the inverted pyramid portion 36. The fifth ray 100 is incident to the second face 96 of the inverted pyramid portion 36 at an angle less than the critical angle and is refracted through the second face 96. Please note that the actual number of light rays emanating from the LED 48 is virtually infinite. Additionally, the number of different paths the light rays may make through the cover 26 to the strip portion 34 and the inverted pyramid portions also is virtually infinite.

Figure 7:
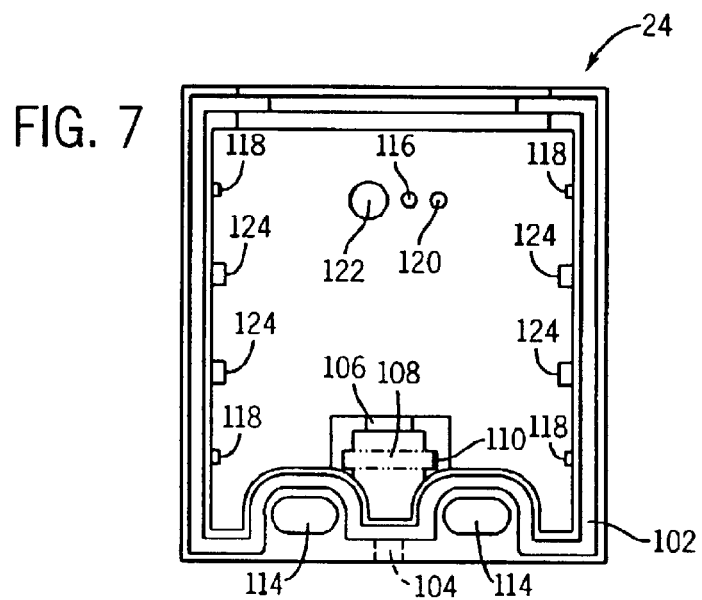
FIG. 7 is a detailed view of a portion of the housing.
Figure 8:
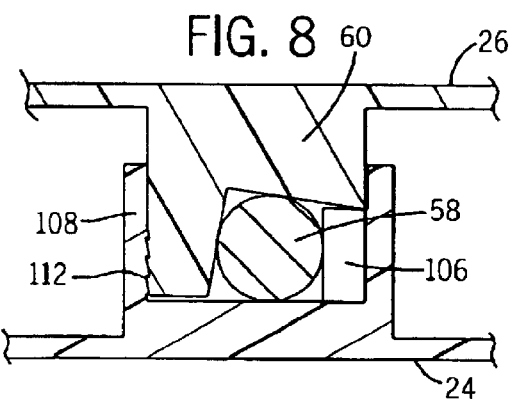
FIG. 8 is an elevational view of the interior of a protective housing, according to an exemplary embodiment of the present invention.

Referring generally to FIGS. 7 and 8, the housing 24 has a groove 102 configured to receive the lip 66 of the cover 26. The housing also has a hole 104 for receiving a conductor cable 58. The housing also has a receiving portion 106 for receiving the cable 58. The receiving portion 106 is notched to guide the cable 58 into the enclosure 22 for coupling to the PC board 42. The housing 24 also has a securing portion 108 configured to receive the clasp 60 of the cover 26 when the cover 26 is placed on the housing 24. The securing portion 108 has a serrated surface 110 configured to contact a serrated portion 112 of the clasp 60. The clasp 60 secures the cable 58 between the cover 26 and the housing 24 as the cover 26 is secured to the housing 24. Additionally, the clasp 60 directs the cable 58 to the desired position within the enclosure. No additional pieces are needed to secure the cable within the enclosure.

The housing 24 also has two openings 114 that align with the opening 68 in the cover 26 for securing the enclosure 22 to an external surface. A guide pin 116 is used to align with a guide hole (not shown) in the PC board 42 to properly position the PC board 42. A plurality of guide members 118 are used with the guide pin 116 to properly align the PC board. In addition, the housing 24 has a first orifice 120 and a second orifice 122 therefore. The first orifice 120 enables light, such as infrared light, to be transmitted from a light source within the enclosure 22 to a target. The second orifice 122 enables light from a target to be detected by a sensor 46 within the enclosure.

Referring to FIGS. 5 and 7, in the illustrated embodiment, a plurality of securing clips 124 on the housing 24 are used to secure the cover 26 to the housing 24. The securing clips 124 are disposed into openings 126 in corresponding securing member 128 on the cover 26. The clips 124 are flexible to allow elastic deformation of the clips 124 during insertion of the clips 124 into the openings 126.

While the invention may be susceptible to various modifications and alternative forms, specific embodiments have been shown in the drawings and have been described in detail herein by way of example only. However, it should be understood that the invention is not intended to be limited to the particular forms disclosed. For example, the present technique may be used with many different types of electronic devices, including many different types of sensors, such as magnetic sensors, proximity sensors, etc. The invention is to cover all modifications, equivalents, and alternatives falling within the spirit and scope of the invention as defined by the following appended claims.

What is claimed is:

1. An electronic device, comprising:
   a protective housing;
   a light source disposed within the protective housing; and
   a cover secured to the protective housing to form a protective enclosure for the electronic device and to form a light guide for guiding a first portion of light from the light source to a first surface portion of the cover, a second surface portion of the cover being adapted to totally internally reflect the first portion of the light to the first surface portion, wherein the first surface portion comprises an inverted pyramid portion extending from a third surface portion of the cover.

2. The electronic device as recited in claim 1, wherein the cover is adapted to refract the first portion of the light through the first surface portion of the cover.

3. The electronic device as recited in claim 1, further comprising a plurality of first surface portions extending from a third surface portion of the cover, wherein each of the first surface portions extends a different distance from the third surface portion.

4. The electronic device as recited in claim 1, wherein the cover is adapted to refract a second portion of light from the light source through the second surface portion.

5. The electronic device as recited in claim 4, wherein the cover has a third surface portion, the cover being adapted to totally internally reflect the first and second portions of light to the second surface portion of the cover.

6. The electronic device as recited in claim 1, wherein the cover comprises a molded polymeric material.

7. The electronic device as recited in claim 6, wherein the polymeric material comprises Trogamid®.

8. An electronic device, comprising:
   a protective housing;
   a light source disposed within the protective housing; and
   a cover secured to the protective housing to form a protective enclosure for the electronic device and to form a light guide for guiding a first portion of light from the light source to a first surface portion of the cover, a second surface portion of the cover being adapted to totally internally reflect the first portion of the light to the first surface portion, wherein the electronic device receives power via a cable inserted into the protective housing, the cover having a guide portion adapted to guide the cable to a desired position and to secure the cable between the protective housing and the cover as the cover is secured to the protective housing.

9. The electronic device as recited in claim 8, wherein the guide portion is configured with a first serrated surface and a corresponding portion of the protective housing is configured with a second serrated surface, the first and second serrated surfaces being adapted for engagement when the cover is disposed on the protective housing.

10. The electronic device as recited in claim 1, wherein the first surface portion is angled with respect to a direction of propagation of light through the cover.

11. The electronic device as recited in claim 1, wherein the first surface portion comprises a plurality of surfaces angled with respect to a direction of propagation of light through the cover, wherein light is refracted through the first surface portion at a plurality of angles with respect to the direction of propagation of light through the cover.

12. The electronic device as recited in claim 1, the cover further comprising a light-receiving portion extending to a position adjacent to the light source.

13. The electronic device as recited in claim 4, wherein the third surface portion has an angle of approximately 25 degrees with respect to an interior surface of the cover.

14. The electronic device as recited in claim 1, wherein the light source is a light emitting diode (LED).

15. The electronic device as recited in claim 1, wherein the cover comprises a material having an index of refraction of approximately 1.566 at a wavelength of 589.3 nm.

16. The electronic device as recited in claim 1, wherein the light source provides light in a plurality of colors.

17. The electronic device as recited in claim 1, wherein the cover is adapted to totally internally reflect light from the light source in a plurality of colors.

18. A protective cover for an enclosure, comprising:
   a first surface region of the cover, the first surface region being oriented on a first side of the enclosure;
   a second surface region of the cover, the second surface region being oriented on a second side of the enclosure; and
   a first portion of the cover, the first portion being adapted to receive light from a light source and totally internally reflect the light to the first surface region and the second surface region, wherein a first portion of the light is totally internally reflected at the first surface region to the second surface region through the first portion of the cover.

19. The cover as recited in claim 18, wherein a second portion of the light is refracted at the first surface.

20. The cover as recited in claim 18, wherein the first portion comprises an angled member extending from a third surface region of the cover.

21. A protective cover for an enclosure, comprising:
   a first surface region of the cover, the first surface region being oriented on a first side of the enclosure;
   a second surface region of the cover, the second surface region being oriented on a second side of the enclosure, wherein the first side of the enclosure is transverse to the second side of the enclosure; and
   a first portion of the cover, the first portion being adapted to receive light from a light source and to totally internally reflect the light to the first surface region and the second surface region.

22. The cover as recited in claim 18, wherein the first side is opposite of the second side.

23. A protective cover for an enclosure, comprising:
a first surface region of the cover, the first surface region being oriented on a first side of the enclosure;
a second surface region of the cover, the second surface region being oriented on a second side of the enclosure; and
a first portion of the cover, the first portion being adapted to receive light from a light source and to totally internally reflect the light to the first surface region and the second surface region, wherein the first surface region is adapted to refract the light from the light source in a plurality of directions.

24. The cover as recited in claim 23, wherein the first surface region is adapted with a plurality of angled surface faces.

25. The cover as recited in claim 18, wherein the first surface region comprises a smooth strip portion of the first surface region.

26. The cover as recited in claim 18, wherein the first surface region comprises an inverted pyramid portion extending from the first side of the enclosure.

27. The cover as recited in claim 18, further comprising a plurality of inverted pyramid portions extending from the first side of the enclosure, wherein a first inverted pyramid portion extends further from the first side of the enclosure than a second inverted pyramid portion.

28. The cover as recited in claim 18, wherein the enclosure receives a cable, the cover having a guide portion adapted to guide the cable to a desired position within the enclosure and to secure the cable between cover and a portion of the enclosure.

29. The cover as recited in claim 28, wherein the guide portion is configured with a first serrated surface and a corresponding portion of the protective housing is configured with a second serrated surface, the first and second serrated surfaces being adapted for engagement when the cover is disposed on the protective housing.

30. The cover as recited in claim 18, wherein the cover is adapted to totally internally reflect a plurality of colors of light from the light source.

31. A cover for an electronic device, comprising:
a first portion adapted to cooperate with a protective housing to form a protective enclosure for the electronic device, the first portion having first and second exterior surface portions oriented at an angle to each other; and
a second portion adapted to extend from the first portion to a position adjacent to a light source within the enclosure, wherein light from the light source is internally reflected through the second portion to the first and second exterior surfaces, and wherein a portion of the light from the light source is refracted at the first and second exterior surfaces, and a portion of the light is totally internally reflected at the first exterior surface portion.

32. The cover as recited in claim 31, wherein the portion of light that is totally internally reflected at the first exterior surface is internally reflected to the second exterior surface portion.

33. A cover for an electronic device, comprising:
a first portion adapted to cooperate with a protective housing to form a protective enclosure for the electronic device, the first portion having first and second exterior surface portions oriented at an angle to each other; and
a second portion adapted to extend from the first portion to a position adjacent to a light source within the enclosure, wherein light from the light source is internally reflected through the second portion to the first and second exterior surfaces, further wherein the light from the light source is refracted at the first and second exterior surfaces, one of the first and second exterior surface portions being adapted to refract the light from the light source in a plurality of directions.

34. The cover as recited in claim 31, wherein one of the first and second exterior surface portions is adapted to produce a plane of refracted light.

35. The cover as recited in claim 31, wherein the electronic device receives a cable, the cover having a guide portion adapted to guide the cable to a desired position and to secure the cable between the protective housing and the cover as the cover is secured to the protective housing.

36. The cover as recited in claim 31, wherein the guide portion is configured with a first serrated surface and a corresponding portion of the protective housing is configured with a second serrated surface, the first and second serrated surfaces being adapted for engagement when the cover is disposed on the protective housing.

37. A method of providing visual information from an electronic device, comprising the acts of:
producing light from a light source housed within a protective enclosure of the electronic device, the light providing data from the electronic device;
adapting the electronic device to guide the light from the light source to a plurality of surface portions of the enclosure using total internal reflection to guide the light through a portion of a cover of the enclosure and to refract the light at the plurality of surface portions so that the light is visible from a plurality of sides of the enclosure; and
providing each of a plurality of light sources housed within the electronic device with a unique color.

38. The method as recited in claim 37, wherein adapting comprises refracting light in a different pattern at each of the plurality of surface portions.

39. The method as recited in claim 37, wherein adapting comprises molding the cover.

* * * * *